US008555477B2

(12) United States Patent
Bates

(10) Patent No.: US 8,555,477 B2
(45) Date of Patent: Oct. 15, 2013

(54) SYSTEM AND METHOD FOR ADJUSTING ROTOR-STATOR CLEARANCE

(75) Inventor: Peter R Bates, Derby (GB)

(73) Assignee: Rolls-Royce PLC, London (GB)

( * ) Notice: Subject to any disclaimer, the term of this patent is extended or adjusted under 35 U.S.C. 154(b) by 498 days.

(21) Appl. No.: 12/786,770

(22) Filed: May 25, 2010

(65) Prior Publication Data

US 2010/0313404 A1 Dec. 16, 2010

(30) Foreign Application Priority Data

Jun. 12, 2009 (GB) .................................. 0910070.2

(51) Int. Cl.
*B23Q 17/00* (2006.01)
*F04D 27/02* (2006.01)
*F04D 29/18* (2006.01)

(52) U.S. Cl.
USPC ...... 29/407.08; 415/1; 415/173.2; 415/173.6; 415/174.1; 415/126; 29/407.05; 277/413

(58) Field of Classification Search
USPC ........... 29/407.08, 407.01, 407.05; 415/1, 12, 415/108, 114, 116, 126, 173.2, 173.3, 415/173.5, 173.6, 174.1, 175; 277/413, 416
See application file for complete search history.

(56) References Cited

U.S. PATENT DOCUMENTS 3,085,398 A * 4/1963 Ingleson ........................ 415/127
3,975,901 A * 8/1976 Hallinger et al. ............... 60/786
4,213,296 A * 7/1980 Schwarz ......................... 60/786
4,247,247 A * 1/1981 Thebert ......................... 415/113
4,363,599 A * 12/1982 Cline et al. ..................... 415/136
4,632,635 A * 12/1986 Thoman et al. ................. 415/14
4,657,479 A * 4/1987 Brown et al. ................. 415/138
4,683,716 A * 8/1987 Wright et al. ................ 60/226.1
4,714,404 A * 12/1987 Lardellier ..................... 415/127
4,844,688 A * 7/1989 Clough et al. ................ 415/116
4,849,895 A 7/1989 Kervistin
5,035,573 A 7/1991 Tseng et al.

(Continued)

FOREIGN PATENT DOCUMENTS

EP 1 655 455 A1 5/2006
EP 1 717 419 A1 11/2006

(Continued)

OTHER PUBLICATIONS

British Search Report issued in British Patent Application No. GB0910070.2 on Oct. 6, 2009.

(Continued)

*Primary Examiner* — Essama Omgba
(74) *Attorney, Agent, or Firm* — Oliff & Berridge, PLC

(57) ABSTRACT

A method and system for adjusting the clearance between a stator member and the tip of a rotor member in a rotor apparatus. The system comprises a position adjustment mechanism for adjusting the radial position of the stator member to any one of at least two and preferably three different radial positions. The system further comprises a variable pressure chamber having a first pressure state and a second pressure state. The system is arranged for applying a force for maintaining the stator member in either one of said at least two radial positions when said chamber is in said first pressure state and for allowing the position adjustment mechanism to adjust the radial position of the stator member between said at least two positions when the chamber is in said second pressure state.

16 Claims, 3 Drawing Sheets

(56) References Cited

U.S. PATENT DOCUMENTS

| | | | | | |
|---|---|---|---|---|---|
| 5,049,033 | A | * | 9/1991 | Corsmeier et al. | 415/173.2 |
| 5,056,988 | A | * | 10/1991 | Corsmeier et al. | 415/173.2 |
| 5,203,673 | A | * | 4/1993 | Evans | 415/173.2 |
| 5,211,534 | A | * | 5/1993 | Catlow | 415/173.2 |
| 5,281,085 | A | * | 1/1994 | Lenahan et al. | 415/116 |
| 5,333,993 | A | * | 8/1994 | Stueber et al. | 415/174.5 |
| 5,545,007 | A | * | 8/1996 | Martin | 415/173.2 |
| 5,601,402 | A | | 2/1997 | Wakeman et al. | |
| 5,871,333 | A | * | 2/1999 | Halsey | 415/173.1 |
| 6,273,671 | B1 | * | 8/2001 | Ress, Jr. | 415/1 |
| 6,406,256 | B1 | * | 6/2002 | Marx | 415/138 |
| 6,463,729 | B2 | * | 10/2002 | Magoshi et al. | 60/39.182 |
| 6,926,495 | B2 | * | 8/2005 | Diakunchak | 415/173.3 |
| 7,125,223 | B2 | * | 10/2006 | Turnquist et al. | 415/173.2 |
| 7,165,937 | B2 | * | 1/2007 | Dong et al. | 415/173.2 |
| 7,575,409 | B2 | * | 8/2009 | Dierksmeier et al. | 415/1 |
| 7,596,954 | B2 | * | 10/2009 | Penda et al. | 60/782 |
| 7,654,791 | B2 | * | 2/2010 | Werner | 415/1 |
| 7,686,569 | B2 | * | 3/2010 | Paprotna et al. | 415/1 |
| 7,909,566 | B1 | * | 3/2011 | Brostmeyer | 415/34 |
| 7,916,311 | B2 | * | 3/2011 | Corn et al. | 356/625 |
| 8,011,883 | B2 | * | 9/2011 | Schwarz et al. | 415/173.2 |
| 8,052,380 | B2 | * | 11/2011 | Willett, Jr. | 415/173.5 |
| 8,087,880 | B2 | * | 1/2012 | Karafillis et al. | 415/118 |
| 8,256,228 | B2 | * | 9/2012 | O'Leary | 60/782 |
| 8,272,835 | B2 | * | 9/2012 | Smith | 415/126 |
| 2007/0292258 | A1 | | 12/2007 | Kirchhof et al. | |
| 2008/0131270 | A1 | * | 6/2008 | Paprotna et al. | 415/173.2 |
| 2010/0104416 | A1 | * | 4/2010 | Willett, Jr. | 415/48 |
| 2011/0229301 | A1 | * | 9/2011 | Miller | 415/1 |
| 2012/0057958 | A1 | * | 3/2012 | Klingels | 415/1 |
| 2012/0063884 | A1 | * | 3/2012 | Klingels | 415/1 |

FOREIGN PATENT DOCUMENTS

| | | | | |
|---|---|---|---|---|
| GB | 2 050 527 | A | | 1/1981 |
| GB | 2063374 | A | * | 6/1981 |
| GB | 2 169 962 | A | | 7/1986 |
| GB | 2 240 818 | A | | 8/1991 |
| GB | 2 253 012 | A | | 8/1992 |
| GB | 2 313 414 | A | | 11/1997 |
| GB | 2 363 864 | A | | 1/2002 |
| JP | S62 142808 | A | | 6/1987 |
| JP | H07 174001 | A | | 7/1995 |

OTHER PUBLICATIONS

May 24, 2013 European Search Report issued in Application No. EP 10 16 3748.

* cited by examiner

SYSTEM AND METHOD FOR ADJUSTING ROTOR-STATOR CLEARANCE

The present invention relates to a system and method for adjusting the clearance between the rotating (rotor) and adjacent non-rotating (stator) components of a rotor apparatus, such as a turbine or compressor. It is envisaged that the invention will be particularly useful in gas turbine engines, but it may be applied to other rotor apparatus as well.

The efficiency of a rotor apparatus depends on many factors. One important factor is the clearance between the outer tips of the rotor members (e.g. rotor blades) and the inner side of any surrounding parts of the stator. If the clearance is too great then fluid may leak which results in a deterioration of performance. However if the clearance is too small there is a risk that the rotor members will contact against the stator causing damage to the various parts. The difficulty is especially pronounced in rotor apparatus, such as a gas turbine engine, which operate at high temperatures. The rotor and stator components often expand and contract at different rates with variations in temperature. For example on engine acceleration the stator usually expands more quickly than the rotor members, but on engine deceleration the stator casing usually contracts more rapidly than the rotor. Therefore control mechanisms are required to control the clearance gap and preferably maintain a substantially constant clearance between the two.

A first prior art method, disclosed in U.S. Pat. No. 5,601,402 proposes a pneumatic system for controlling the clearance gap. A stator shroud forms a ring surrounding the rotor. The ring is segmented into a plurality of segments. The stator segment is supported by a carrier which comprises a pneumatically inflatable cavity. In normal operation the cavity is inflated with high pressure gas ducted from another part of the turbine engine. This gas exerts a pressure greater than the pressure exerted by the fluid flow from the rotor adjacent the stator segment. This pressure differential exerts a radially inward force on the stator segment pushing it inwards. If the pressure in the cavity is reduced such that it is less than the pressure generated by core fluid flows in the rotor, then the pressure differential pushes the stator segment radially outward. Radial movement of the stator member is limited by an upper stop and a lower stop. When the cavity is at high pressure and inflated the carrier abuts against the lower stop and the stator segment adopts a first "inner" radial position. When the cavity is at low pressure the carrier and stator move upwards and the carrier abuts against the second stop. The stator segment is then in the second "outer" radial position. The contents of U.S. Pat. No. 5,601,402 are incorporated herein by reference.

The above described first prior art method has several limitations. Firstly it is only capable of adjusting the position of the stator between two different radial positions. In operation the stator is either in the inner position or the outer position. Secondly the system is only suitable for maintaining the stator in the outer position temporarily for a short period of time. Thirdly for the duration in which the stator segment is maintained in the outer position cooling air must be dumped overboard which is costly in terms of engine performance.

A second prior art method, disclosed in U.S. Pat. No. 5,035,573 (which is incorporated herein by reference), proposes using a mechanical actuator for a adjusting the clearance gap between the rotor and stator. Mechanical actuators tend to be heavy, expensive and difficult to locate and operate, especially in a high temperature environment. This difficulty is made worse as, if the actuator is to be used while the rotor apparatus is in operation, then the actuator needs to be powerful enough to generate sufficient force to overcome the outward pressure generated by fluid flows in the rotor apparatus.

A first aspect of the present invention provides a system for adjusting the clearance between a stator member and the tip of a rotor member in a rotor apparatus. The rotor apparatus may, for example, be a turbine, compressor, pump, fan or other similar device. In a preferred embodiment the rotor apparatus is a part of a gas turbine engine. The rotor member is preferably a rotor blade or rotor bucket. The stator member may be a segment of a stator's shroud, but is not limited thereto.

The system comprises a position adjustment mechanism for adjusting the radial position of the stator member relative to an axis of the rotor apparatus to any one of at least two different radial positions; said position adjustment mechanism being operable when said rotor apparatus is in operation; and a variable pressure (fluid) chamber having a first pressure state and a second pressure state. The system is arranged for applying a force for maintaining the stator member in either one of said at least two radial positions when the chamber is in said first pressure state and for allowing the position adjustment mechanism to adjust the radial position of the stator member between said at least two positions when the chamber is in said second pressure state.

In this way the stator member may be kept continuously in either of at least two radial positions when the variable pressure chamber is in the first pressure state. The second pressure state may be used to adjust the stator between the two positions. Furthermore, a relatively low force may be used to adjust the position of the stator when the variable pressure chamber is in the second pressure state. Thus low force solutions, such as a low load actuator may be used to change the stator member position.

Preferably the position adjustment mechanism is capable of adjusting the position of the stator member to any of at least three different radial positions. This is advantageous over certain prior art were the stator member could only be supported in two radial positions. The position adjusting member may be capable of adjusting the position to even more positions, e.g. 4 or more. The adjustment may be stepwise between discrete positions. Alternatively the position adjustment member may be capable of continuous radial position adjustment between two end points, the stator member being supportable at any point between said two end points.

Preferably the first pressure state is a high pressure state and the second pressure state is a low pressure state. This has the advantage that the stator member can be fixed in a plurality of different radial positions (at least two, preferably three or more) when the variable pressure chamber is at high pressure. The chamber then only needs to be at low pressure during the adjustment period between the different radial positions. This has the benefit that it minimises time spent in the low pressure state. It is desirable to minimise time spend in the low pressure state, as the low pressure state may require dumping of cold fluid which is bad for the rotor apparatus efficiency.

The variable pressure chamber may be kept in a high pressure state by supply of pressurised fluid through a fluid inlet. The pressurised fluid may be channeled from another region of the rotor apparatus; for example, in the case of a gas turbine engine, fluid may be taken from the compressor region, especially the outlet of the compressor. The variable pressure chamber may be switched from the high pressure state to a low pressure state by opening a pressure dump valve. The pressurised fluid is then released to a low pressure region.

The system may comprise a support structure for supporting the stator member in a plurality of different radial positions relative to the axis of the rotor apparatus. In this case the position adjustment mechanism may be used to change the position at which the stator member is supported by said support structure. For example, the support structure may rest on an adjustable member whose radial height is adjustable; so by adjusting the radial height of the adjustable member the radial height (more precisely the radial position in the inward or outward direction) may be adjusted.

The stator member may be a segment forming part of a ring surrounding the rotor. E.g. the ring may comprise a plurality of segments each of which may be adjustable as discussed above. More precisely the stator may be azimuthally segmented. The stator member may be part of a shroud of the stator; the shroud may ring shaped and azimuthally segmented etc.

The position adjustment mechanism comprises a cam. The radial position in which the stator segment is supported may be adjustable by rotation of the cam. The radius of the cam may vary step-wise or continuously.

The position adjustment mechanism may comprise a first member and a second member. The second member may be located radially outward from the first member and may be physically separate from and movable relative to the first member. Furthermore, the second member is preferably part of, or mechanically connected to, a support structure for supporting the stator member. The system is preferably arranged such that when the variable pressure chamber is in the first pressure state said force pushes the first and second members together, and when the variable pressure chamber is in the second pressure state said force is reduced, eliminated or reversed. The force may for example be a consequence of pressure differentials between the core fluid flow in the rotor apparatus and the pressure in the variable pressure chamber. The said force for maintaining the stator member in position may push the second member radially inward onto the first member. In the second pressure state the second member may lift off the first member and move further radially outward (e.g. if a pressure differential is created which reverses the force in the first pressure state). This makes it easy for the position adjustment member to adjust the position in which the stator member is supported on the return to the first pressure state in which the first and second members are again pushed together. For example, the radial position of the first member may be adjusted inwards or outwards so that the second member later comes to rest at a different radial position. Alternatively if the first or second member is a cam, then the cam may be rotated easily when the variable pressure chamber is in the second pressure state. Rotating the cam may change the position in which the stator member is supported when the variable pressure chamber returns to the first pressure state.

The system may further comprise an actuator for causing the position adjustment mechanism to adjust the radial position in which the stator member is supported. The actuator may be a low load actuator which is capable of actuating the position adjustment mechanism when the variable pressure chamber is in its second pressure state, but not capable of actuating the position adjustment mechanism when the variable pressure chamber is in its first pressure state. I.e. the actuator may not be able to overcome the position maintaining force which is applied when the variable pressure chamber is in the first pressure state. The actuator may be a mechanical actuator (e.g. with mechanical, electrical and/or pneumatic parts).

Alternatively the system may make use of pressurised fluid from the variable pressure chamber to actuate the position adjustment mechanism. The variable pressure chamber may have an exhaust system (e.g. a pressure dump valve) for exhausting pressurised fluid. The exhaust system may be arranged to direct the exhausted fluid to a feature on the cam for converting the force of the exhausted fluid into rotational motion of the cam. For example, the exhaust valve may have an elongate exhaust for channeling the fluid to said feature. Preferably the cam has a plurality of such features, which may be arranged evenly spaced in a circle around the axis of the cam. The features may comprise a slanted or angled surface for catching the exhausted fluid. The system may be arranged to release the pressurised fluid for a predetermined period of time every time the variable pressure chamber is switched from the high to low pressure states, in this way the force applied to the cam and the degree of rotation of the cam may be controlled. Further, the cam may have a ratchet arrangement for controlling the rotation of the cam. The system may be configured such that the release of pressurised fluid has sufficient force to be capable of moving the cam around by one ratchet only, thereby limiting the degree of rotation for each release of pressurised fluid from the variable pressure chamber. Further the exhaust of pressurised fluid may generate sufficient force to rotate the cam when the variable pressure chamber is in the second (e.g. low) pressure state, but not the first (e.g. high) pressure state.

The system may have a plurality of stator members. The clearance between the rotor member tips and each stator member, or each group of stator members, may be independently controllable by respective position adjustment mechanisms. That is each stator member, or group of stator members, may have its own respective position adjustment mechanism as described above. Preferably each position adjustment mechanism is associated with its own respective variable pressure chamber, also as discussed above. As the respective position adjustment mechanisms are independently controllable, the radial position of each stator member (or positions of each stator member in a given group), may be adjusted independently of each other to different positions. This allows the apparatus to take account of and compensate for asymmetric effects in which the clearance gap varies in different regions around the rotor. Examples of asymmetric effects are casing hot spots or engine loads that cause rotor displacement, in which the rotor stator gap closes or opens in local regions around the circumference.

A second aspect of the present invention provides a rotor apparatus having a system for adjusting the clearance according to the first aspect of the invention. The rotor apparatus may, for example, be a turbine, compressor, pump, fan or other similar device. In a preferred embodiment the rotor apparatus is a part of a gas turbine engine.

A third aspect of the present invention provides a method of adjusting the clearance between a stator member (especially, but not necessarily a shroud segment) and the tip of a rotor member (e.g. a rotor blade or bucket) in a rotor apparatus (e.g. a turbine, compressor, pump or fan etc).The method comprises the steps of:— a) providing a position adjustment mechanism for adjusting the radial position of the stator member relative to an axis of the rotor apparatus to any one of at least two different radial positions;

b) providing a variable pressure chamber having a first pressure state and a second pressure state; the system being configured such that it applies a force maintaining the stator member in either one of said at least two radial positions when the chamber is in said first pressure state and allows adjustment of the radial position of the stator member when the variable pressure chamber is in said second pressure state;

c) operating the rotor apparatus so that the rotor member rotates;

d) putting the variable pressure chamber in the first pressure state and supporting the stator member in a first radial position;

e) changing the pressure of the variable pressure chamber from the first pressure state to the second pressure state;

f) when the chamber is in the second pressure state using the position adjustment mechanism to change the radial position at which the stator member is supported from said first radial position to a second radial position;

g) returning the pressure of the variable pressure chamber from the first pressure state to the second pressure state while maintaining the stator member in the second radial position.

Preferably the position adjustment mechanism is capable of adjusting the position of the stator member to any of at least three different radial positions and wherein prior to step f) there is a further step of selecting which of two possible different second radial positions to move the stator member to and in step f) the stator member is moved to the selected second radial position.

Preferably the first pressure state is a high pressure state and the second pressure state is a low pressure state.

Preferably the position adjustment mechanism comprises a first member and a second member, the second member being located radially outward from the first member and being physically separate from and movable relative to the first member, the method comprising the steps of generating a force pushing the first and second members together when the variable pressure chamber is in the first pressure state, and reducing, eliminating or reversing said force when the variable pressure chamber is in the second pressure state. This facilitates easy adjustment of the position in which the stator member is supported in step f). Either the first or second member may comprise a rotable cam; in which case in step f) the radial position at which the stator member is supported may be adjusted by rotating said cam.

In step f) an actuator may be used to cause the position adjustment mechanism to adjust the radial position in which the stator member is supported. The actuator may be a mechanical actuator. Alternatively the system may use pressurised fluid from the variable pressure chamber to actuate the position adjustment mechanism.

There may be a plurality of stator members and the clearance between the rotor member tips and each stator member, or each group of stator members, may be controlled independently by respective position adjustment mechanisms (and preferably associated respective variable pressure chambers). In this way the clearance for each stator member, or each group or stator members, can be different, in order to take account of asymmetrical conditions.

Further, the third aspect of the invention may use the apparatus of the first or second aspects of the invention and may have any of the features discussed in those aspects.

Embodiments of the invention will now be described by way of example with reference to the accompanying drawings in which.

The present invention relates to a system and method for adjusting the clearance between the rotating (rotor) and adjacent non-rotating (stator) components of a rotor apparatus, such as a turbine or compressor. It may also be used with other rotating apparatus such as a fan or pump. In a preferred embodiment the system is used in a gas turbine engine.

Figure 1:
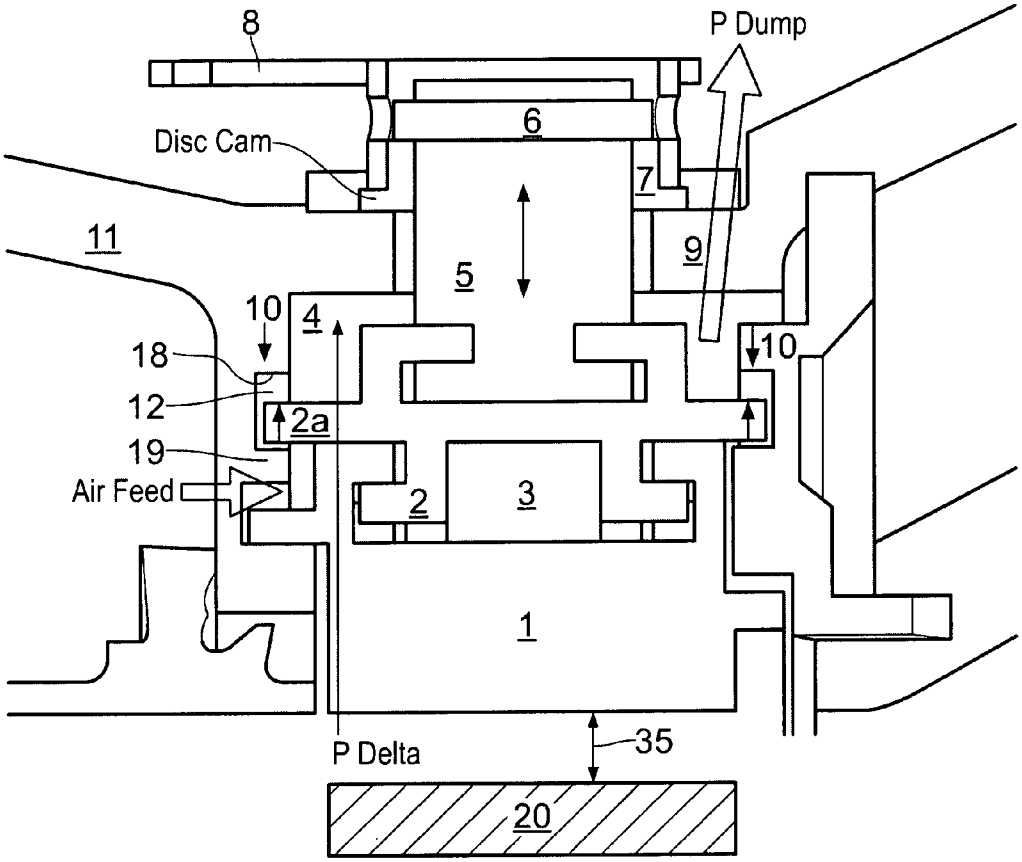
FIG. 1 shows a system for adjusting the clearance between a rotor member tip and a stator member.

An example of the system will now be described. The system is for use in a rotor apparatus such as the one shown in FIG. 6 having a rotor 200 with one or more rotor members (e.g. blades or buckets) 20 and a stator 100. The rotor members 20 have tips 22 at their radially outward points and rotate around a rotor axis 40. In this example, the stator 100 is segmented azimuthally into a plurality of stator members 1. More specifically the stator has a shroud 100 which is segmented azimuthally into a plurality of segments 1. One of the segments 1 is shown in FIG. 1. The segments 1 form a ring around the tip 20 of the rotor members. The gap between the tip of the rotor member 20 and the radially inner surface of the segment 1 is called the 'clearance gap' 35.

The segment 1 is supported by a carrier 2. The carrier 2 is supported by a shaft 5 which extends radially through the casing 11 of the shroud. A position adjustment or control mechanism controls the radial position at which the segment 1 is supported by the carrier 2 and shaft 5.

On the external side of the casing 11 the shaft 5 has a pin 6 extending through it. A protruding portion of the pin 6 sits on a disc cam 7. The disc cam 7 together with the pin 6 forms a position adjustment or control mechanism which controls the radial position of the shaft 5, carrier 2 and segment 1. By rotating the disc cam 7 the radial position of the segment 1 can be adjusted. The system is able to adjust the position of the segment 1, while the rotor apparatus is in operation (i.e. while the rotor is rotating). "Radial position" means the radial position in relation to the axis of rotation of the rotor. In FIG. 1 "radially outward" is in the direction towards the top of the figure and "radially inward" is in the direction towards the bottom of the figure.

A variable pressure chamber 4 is formed by a cavity above the segment 1 and carrier 2. The variable pressure chamber 4 is capable of adopting first and second pressure states. In this embodiment the first pressure state is a high pressure state and the second pressure state is a low pressure state. When in the high pressure state, the variable pressure chamber 4 has a higher pressure than that of the core fluid (e.g. gas) flow of the rotor apparatus below the segment 1. This creates a pressure delta (pressure differential) which exerts a radially inwards force on the segment 1. This force urges the segment 1 and the carrier radially inward. As a result a portion 2*a* of the carrier 2 is pushed against a stop 18 of the casing 11. The segment 1 and carrier 2 are thus held or maintained in position when the variable pressure chamber 4 is in the high pressure state.

The variable pressure chamber 4 can be switched to a low pressure state by allowing the fluid (e.g. air) in the cavity to exit rapidly. This may, for example, be achieved by opening a valve 9 which vents the fluid into a low pressure region.

In its low pressure state, the chamber 4 now has a lower pressure than the core gas flow in the rotor apparatus. This creates a large pressure differential in the other direction, from the core gas flow towards the chamber 4. This forces the segment 1, the carrier 2 and the shaft 5 to move radially outwards (upwards in FIG. 1). The extent of the movement outwards is limited by a stop 19 of the casing 11. Thus it can be seen that the radial movement of the carrier 2 (and thus the segment 1) is limited by the two opposing stops 18, 19. A portion of the carrier 2 is received in the gap 10 between the stops 18, 19 and abuts against the first stop 18 when the variable pressure chamber is in the high pressure state.

Figure 2:
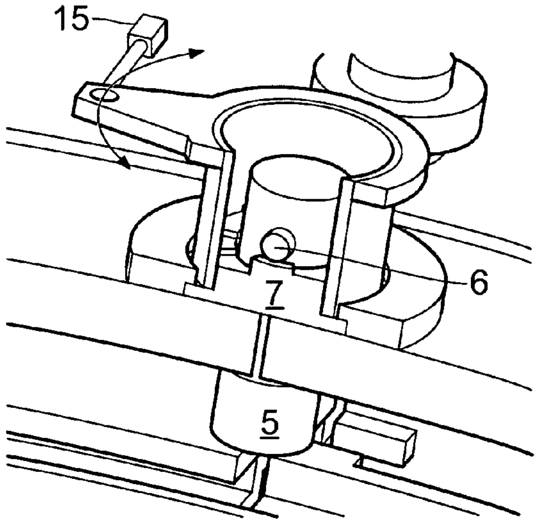
FIG. 2 shows a perspective view of an upper part of the system of FIG. 1.

When the variable pressure chamber 4 is in the low pressure state the shaft 5 moves radially outward. As the shaft 5 is moved outwards, the pin 6 is lifted off the disc cam 7. The pin 6 and disc cam 7 are best seen in FIG. 2. When the chamber 4 is in the low pressure state, the disc cam 7 is no longer reacting the inward force from the segment 1 and thus can be rotated. As there is no force acting on the disc cam 7 only a small force is required to rotate it.

A small light weight low load mechanical actuator 15 can be used to rotate the disc cam 7. The disc cam 7 is rotated to the required position to give the desired radial position for the segment 1. The variable pressure chamber 4 is then put back into the high pressure state by closing the valve 9. This causes the chamber 4 to re-pressurised by means of small flow holes 12 and/or leakage around the hooks. The holes 12 receive pressured fluid and may be arranged to receive pressurised fluid from another region of the rotor apparatus. If the rotor apparatus is a gas turbine engine then the pressurised fluid may be channeled from the compressor region of the gas turbine engine. Once the cavity is re-pressurised to a sufficient level the pressure delta to the core fluid is reversed and the segment 1, carrier 2 and shaft 5 move radially inwards (towards the bottom of FIG. 1).

As the segment 1 moves radially inwards (towards the bottom of FIG. 1), it pulls the carrier 2 and shaft 5 with it. This exerts a force urging the pin 6 into contact with the cam 7. The pin 6 then rests against and is supported by the cam 7. As can be seen in FIG. 2, the cam has a plurality of steps of different heights. The radial position at which the shaft 5 (and carrier 2 and segment 1) is supported by the cam 7 is determined by the height of the step on which the pin 6 rests. Thus by choosing the step of the correct height, the desired radial position of the segment 1 can be achieved. It is possible to adjust the radial position in which the segment 1 and carrier 2 is supported to any one of a plurality of different possible radial positions corresponding to the steps of the cam. Preferably the cam has at least 3 steps providing at least three different possible radial positions for the segment 1. In alternative embodiments the cam is not stepped but varies in height continuously (e.g. a smooth slope), making it possible to vary the radial position of the segment 1 with even more precision.

Figure 6:
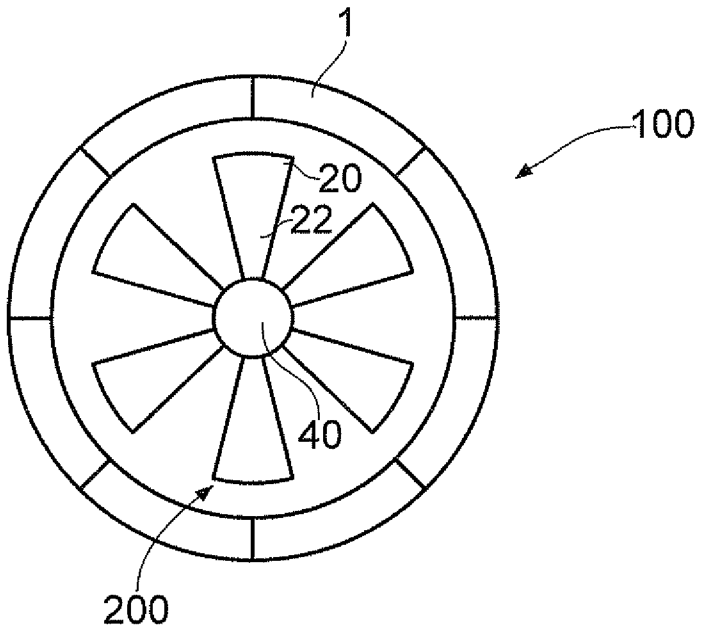
FIG. 6 shows a rotor apparatus in which the stator is divided into a plurality of segments.

Adjustment of the radial position of a single stator segment 1 has been discussed above. The stator shroud has a plurality of segments which form a ring around the rotor as shown in FIG. 6. Each segment may have a system for controlling its radial position as discussed above. That is each segment may have a respective carrier, shaft, pin and cam and a respective variable pressure chamber. In that way the radial position of each individual segment can be controlled independently. That makes it possible for the system to take account of and compensate for asymmetric effects in which the clearance gap varies in different regions around the rotor. Examples of asymmetric effects are casing hot spots or engine loads that cause rotor displacement in which the rotor stator gap closes or opens in local regions around the circumference. A system of this type, in which the segments are controlled individually, would have an added advantage in that all the segments could initially be built to a nominal position with a relatively large tolerance. On the first engine run the position control system would then set & adjust the position of each segment to a specific tip gap, removing build tolerances. The advantage of this is that the control and setting of the tip clearance gap on build is less important, reducing the time required for build.

Alternatively the position control mechanism for all of the segments may be linked so that the position of each is adjusted by the same amount. This may be achieved, for example, by linking the variable pressure chambers and mechanically linking the cams. Linking of the cams (or other position control mechanisms) may be achieved, for example, by use a unison ring, a flexible connector and/or gearing. Uniform control of the tip gap for all the segments would mean that only one or a small number of actuators could be used to control the position setting mechanism. A reduced number of actuators would simplify the system and increase reliability.

Another alternative arrangement is to divide the segments into a plurality of groups (each group comprising a plurality of segments) and control each group independently. For example each group may comprise three adjacent segments. In this way the radial position of the segments in each group is kept the same, but the position may differ between different groups. This combines the advantages of the other two approaches discussed above, e.g. a certain degree of asymmetric effects can be accommodated, but the number of actuators is still reduced compared to control of each segment independently.

While a specific example of a pin and disc cam arrangement has been discussed above, the position adjustment mechanism could take a number of alternative forms. The basic principle is that the position adjustment mechanism is operated when it isn't loaded which means it only requires a low load to move it.

Generally the position adjustment mechanism will comprise first and second members. In the above example the first member was a disc cam 7 and the second member a pin 6. In an alternative arrangement, the cam could be on the pin instead (e.g. like an internal combustion engine valve cam). That is the first member could be a flat support (e.g. a flat disc) and the second member would be a pin cam. In this instance the pin through the shaft would be rotated to control the radial position in which the segment 1 is supported.

In another alternative arrangement the cam disc 7 may be replaced by an axial cam system that is actuated axially in line with the rotor axis (extending in the direction from the left to right of FIG. 1). The pin could rest on top of the axial cam and by rotating this axial cam the radial position in which the segment 1 is supported could be adjusted.

Furthermore, while cams are a convenient method of adjusting the radial position, the position adjustment mechanism of the present invention is not limited and need not necessarily use camst. The position adjustment mechanism could use other means for adjusting the radial position of the segment 1. For example, the first member could be a to support having an adjustable height (e.g. it may be movable radially inward and outward) and the second member could be a protrusion from the shaft 5 which ordinarily rests on the support.

In the preferred embodiment described above the first member (e.g. a disc cam 7) and second member (e.g. a pin 6) are pressed together when the variable pressure chamber 4 is in a high pressure state. In the low pressure state they are free to move and the radial position may be adjusted. However, it would be possible to have a different configuration in which the first and second members were pressed together when the variable pressure chamber was in the low pressure state and free to move when the chamber was in a high pressure state. For example if the pin was radially inward of the cam 7 then the two would be pushed together when the chamber 4 was in a low pressure state and the shaft 5 moved radially outward (upwards in FIG. 1). When the chamber 4 was in a high pressure state, then the segment 1 and shaft 5 would move radially inwards (downwards in FIG. 1) and the pin would move away from the cam allowing it to be rotated.

An actuator 15 is preferably used to actuate the position adjustment mechanism to adjust the radial position in which the segment 1 is supported. Many different ways of actuating the position control mechanism could be used. For example the actuator may be mechanical (i.e. arranged to actuate the position adjustment mechanism through a mechanical connection) and may, for example, be powered electrically or pneumatically. Where the position adjustment mechanism comprises a cam, the cam may for example be actuated by a unison ring, a flexible connector and gearing. Many different types of suitable actuator will be apparent to a person skilled in the art. The key point is that whatever actuator is used it will not have to supply much force.

Alternatively the position adjustment mechanism may be actuated by using pressurised air from the variable pressure chamber 4. For example, the flow of air that exits from the chamber 4 when the pressure dump valve 9 is opened may be used to actuate the position adjustment mechanism. Using the air flow from the variable pressure chamber has the advantage that the design may simple and that a separate mechanical actuator is not needed.

Figure 3:
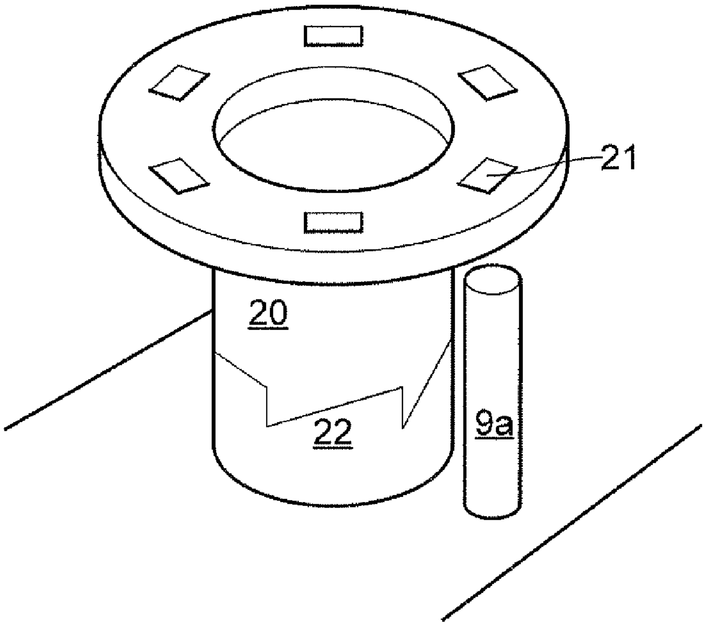
FIG. 3 shows an alternative arrangement using pressurised fluid to actuate adjustment of the clearance gap.
Figure 4:
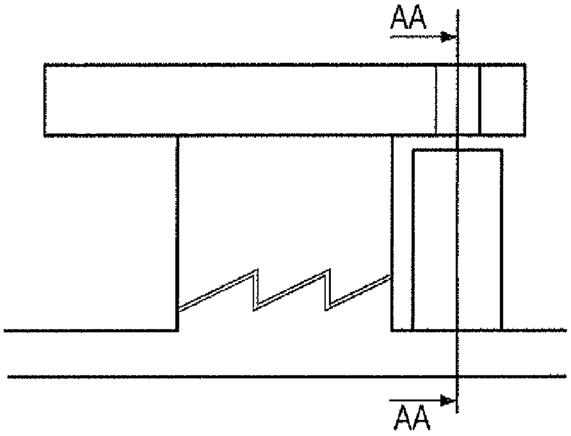
FIG. 4 is a first cross section of the arrangement of FIG. 3.
Figure 5:
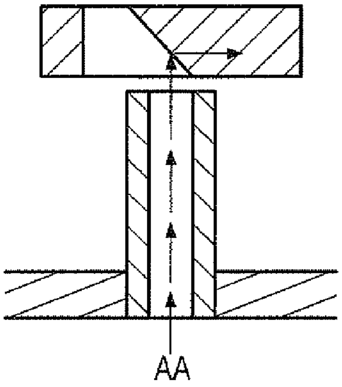
FIG. 5 is a second cross section of the arrangement of FIG. 3.

FIGS. 3, 4 and 5 show an example of how the above mentioned fluid flow can be used to rotate the disc cam. This arrangement may be used instead of a separate mechanical actuator 15 as shown in FIG. 1. The cam 7 of the type shown in FIG. 1 is replaced with a cam 20 having a plurality of features 21 for catching the flow of pressurised fluid exhausted by the valve 9 of the variable pressure chamber 4. More specifically the features 20 are designed for converting the force from the flow of the fluid into rotational motion of the cam. They may take the form of depressions or angled surfaces in the cam. In FIG. 3 the features are holes with angled surfaces for catching the fluid flow and converting it into rotational motion (see FIGS. 4 and 5). FIG. 4 is a cross section showing a ratchet arrangement, exhaust and cam. FIG. 5 is a cross section showing the flow of air through the valve 9 and the feature 21 of the cam 20.

The pressure dump valve 9 of the variable pressure chamber 4 has an elongate exhaust 9*a* which channels the exhausted fluid (e.g. air) to the features 21 on the cam 20, forcing the cam to rotate. Preferably the features 21 are evenly spaced around the cam.

The degree of angular rotation of the disc cam 20 may be controlled by ensuring that the time duration and pressure of the exit fluid flow is consistent in order to ensure consistent angular rotation for each opening of the valve 9. The features 21 are preferably alike, e.g. having the same size and angle of slope, to ensure consistent angular rotation.

In the example shown in FIGS. 3 to 5, a ratchet type arrangement 22 is fitted to the disc cam 20. The exit air flow in combination with the angled surface geometry provides sufficient force to rotate the disc cam 20 by one ratchet only each time. In this way the angular rotation is controlled so that a consistent angular rotation is achieved for each opening of the valve 9. The number of ratchets preferably corresponds to the number of features 21.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A system for adjusting the clearance between a stator member and the tip of a rotor member in a rotor apparatus; the system comprising:

a position adjustment mechanism for adjusting the radial position of the stator member relative to an axis of the rotor apparatus to any one of at least two different radial positions; said position adjustment mechanism being operable when said rotor apparatus is in operation; and a variable pressure chamber having a first pressure state and a second pressure state;

the system is arranged for applying a force for maintaining the stator member in either one of said at least two radial positions when said chamber is in said first pressure state and for allowing the position adjustment mechanism to adjust the radial position of the stator member between said at least two positions when the chamber is in said second pressure state, wherein the position adjustment mechanism comprises a first member and a second member, the second member being located radially outward from the first member and being physically separate from and movable relative to the first member, the system being arranged such that when the variable pressure chamber is in the first pressure state said force pushes the first and second members together, and when the variable pressure chamber is in the second pressure state said force is reduced, eliminated or reversed, and wherein either the first or second member comprises a rotable cam, whereby the radial position at which the stator member is supported can be adjusted by rotating said cam.

2. A system according to claim 1 wherein the position adjustment mechanism is capable of adjusting the position of the stator member to any of at least three different radial positions.

3. A system according to claim 1 wherein the first pressure state is a high pressure state and the second pressure state is a low pressure state.

4. A system according to claim 1 wherein the system comprises a support structure for supporting the stator member in a plurality of different radial positions relative to the axis of the rotor apparatus and the position adjustment mechanism changes the position at which the stator member is supported by said support structure.

5. A system according to claim 1 wherein the stator member is a segment forming part of a ring surrounding the rotor.

6. A system according to claim 1 wherein position adjustment mechanism comprises a cam.

7. A system according to claim 1 comprising an actuator for causing the position adjustment mechanism to adjust the radial position in which the stator member is supported.

8. A system according to claim 7 wherein the actuator is capable of actuating the position adjustment mechanism when the variable pressure chamber is in its second pressure state, but not capable of actuating the position adjustment mechanism when the pressure chamber is in its first pressure state.

9. A system according to claim 8 wherein the actuator is a mechanical actuator.

10. A system according to claim 1 wherein the system is arranged to use pressurised fluid from the variable pressure chamber to actuate the position adjustment mechanism.

11. A system according to claim 1 wherein there is a plurality of stator members, the clearance between the rotor member tips and each stator member or each group of stator members being independently controllable by respective position adjustment mechanisms.

12. A method of adjusting the clearance between a stator member and the tip of a rotor member in a rotor apparatus; the method comprising the steps of:

a) providing a position adjustment mechanism for adjusting the radial position of the stator member relative to an axis of the rotor apparatus to any one of at least two different radial positions;

b) providing a variable pressure chamber having a first pressure state and a second pressure state; the system being configured such that it applies a force maintaining the stator member in either one of said at least two radial positions when the chamber is in said first pressure state and allows adjustment of the radial position of the stator member when the variable pressure chamber is in said second pressure state;

c) operating the rotor apparatus so that the rotor member rotates;

d) putting the variable pressure chamber in the first pressure state and supporting the stator member in a first radial position;

e) changing the pressure of the variable pressure chamber from the first pressure state to the second pressure state;

f) when the chamber is in the second pressure state using the position adjustment mechanism to change the radial position at which the stator member is supported from said first radial position to a second radial position;

g) returning the pressure of the variable pressure chamber from the first pressure state to the second pressure state while maintaining the stator member in the second radial position;

wherein the position adjustment mechanism comprises a first member and a second member, the second member being located radially outward from the first member and being physically separate from and movable relative to the first member, the method comprising the steps of generating a force pushing the first and second members together when the variable pressure chamber is in the first pressure state, and reducing, eliminating or reversing said force when the variable pressure chamber is in the second pressure state, and wherein either the first or second member comprises a rotable cam and wherein in step f) the radial position at which the stator member is supported is adjusted by rotating said cam.

13. A method according to claim 12 wherein the position adjustment mechanism is capable of adjusting the position of the stator member to any of at least three different radial positions and wherein prior to step f) there is a further step of selecting which of two possible different second radial positions to move the stator member to and in step f) the stator member is moved to the selected second radial position.

14. A method according to claim 13 wherein the first pressure state is a high pressure state and the second pressure state is a low pressure state.

15. A method a according to claim 12 wherein the system comprises a support structure for supporting the stator member in a plurality of different radial positions relative to the axis of the rotor apparatus and wherein in step f) the position adjustment mechanism changes the position at which the stator member is supported by said support structure.

16. A method according to claim 12 wherein the position adjustment mechanism comprises a cam and wherein in step f) the radial position at which the stator member is supported is adjusted by rotating said cam.

* * * * *